Figure 1:
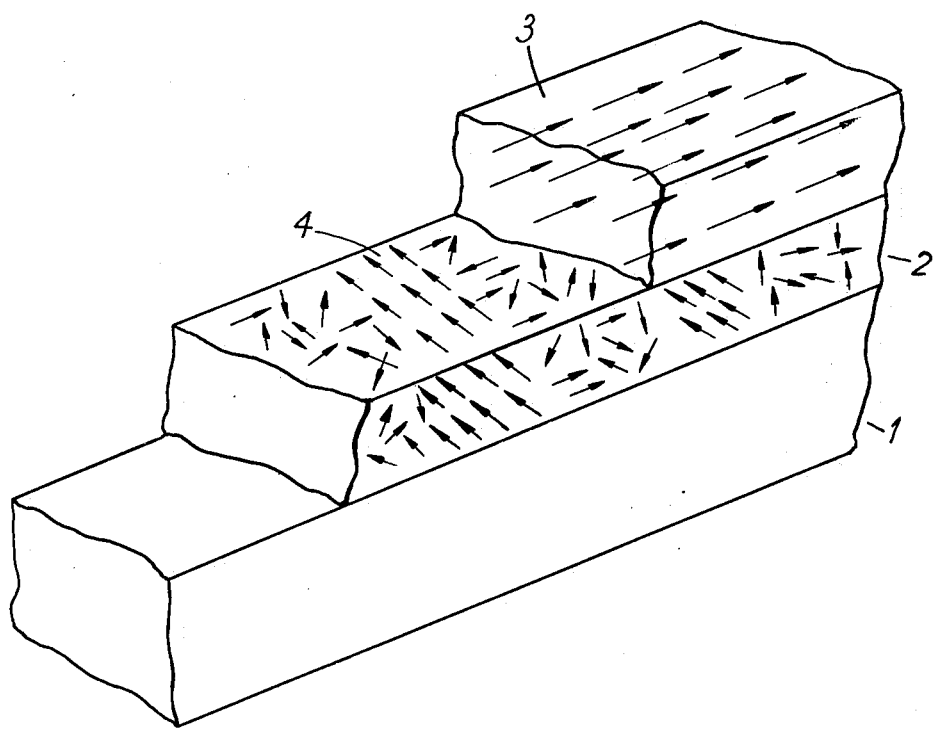

United States Patent [19]
Lee

[11] 4,114,029
[45] Sep. 12, 1978

[54] MAGNETIC RECORDING

[75] Inventor: Cyril Arthur Lee, Maidenhead, England

[73] Assignee: E M I Limited, Hayes, England

[21] Appl. No.: 622,753

[22] Filed: Oct. 15, 1975

[30] Foreign Application Priority Data

Oct. 16, 1974 [GB] United Kingdom ............... 44746/74

[51] Int. Cl.² ...................... G06K 7/08; G06K 19/06; G11B 25/04
[52] U.S. Cl. .................................... 235/449; 235/493; 360/2
[58] Field of Search ................ 235/61.11 D, 61.12 M, 235/61.7 B; 360/2; 340/149 A

[56] References Cited

U.S. PATENT DOCUMENTS

| | | | |
|---|---|---|---|
| 3,566,356 | 2/1971 | Holm et al. ............................... | 360/2 |
| 3,571,799 | 3/1971 | Coker, Jr. et al. ............ | 235/61.11 D |
| 3,634,797 | 1/1972 | Burkholter .................... | 235/61.12 M |
| 3,743,134 | 7/1973 | Constable et al. ............ | 235/61.11 D |
| 3,790,754 | 2/1974 | Black et al. .................. | 235/61.12 M |
| 3,873,975 | 3/1975 | Miklos et al. ................. | 235/61.11 D |
| 3,878,367 | 4/1975 | Fayling et al. ................ | 235/61.11 D |

FOREIGN PATENT DOCUMENTS 1,331,604 9/1973 United Kingdom ............. 235/61.12 M Primary Examiner—Daryl W. Cook
Attorney, Agent, or Firm—Fleit & Jacobson

[57] ABSTRACT

Magnetic recording media including permanent structures of aligned acicular particles have been proposed as a means of identifying and authenticating a medium. A structure of such a media by which information can be recorded and read-out without interference from the structural remanence difference is described. An apparatus and method for the examination of such media for their permanent structures, particularly when used in security documents such as credit cards, are also described.

11 Claims, 3 Drawing Figures

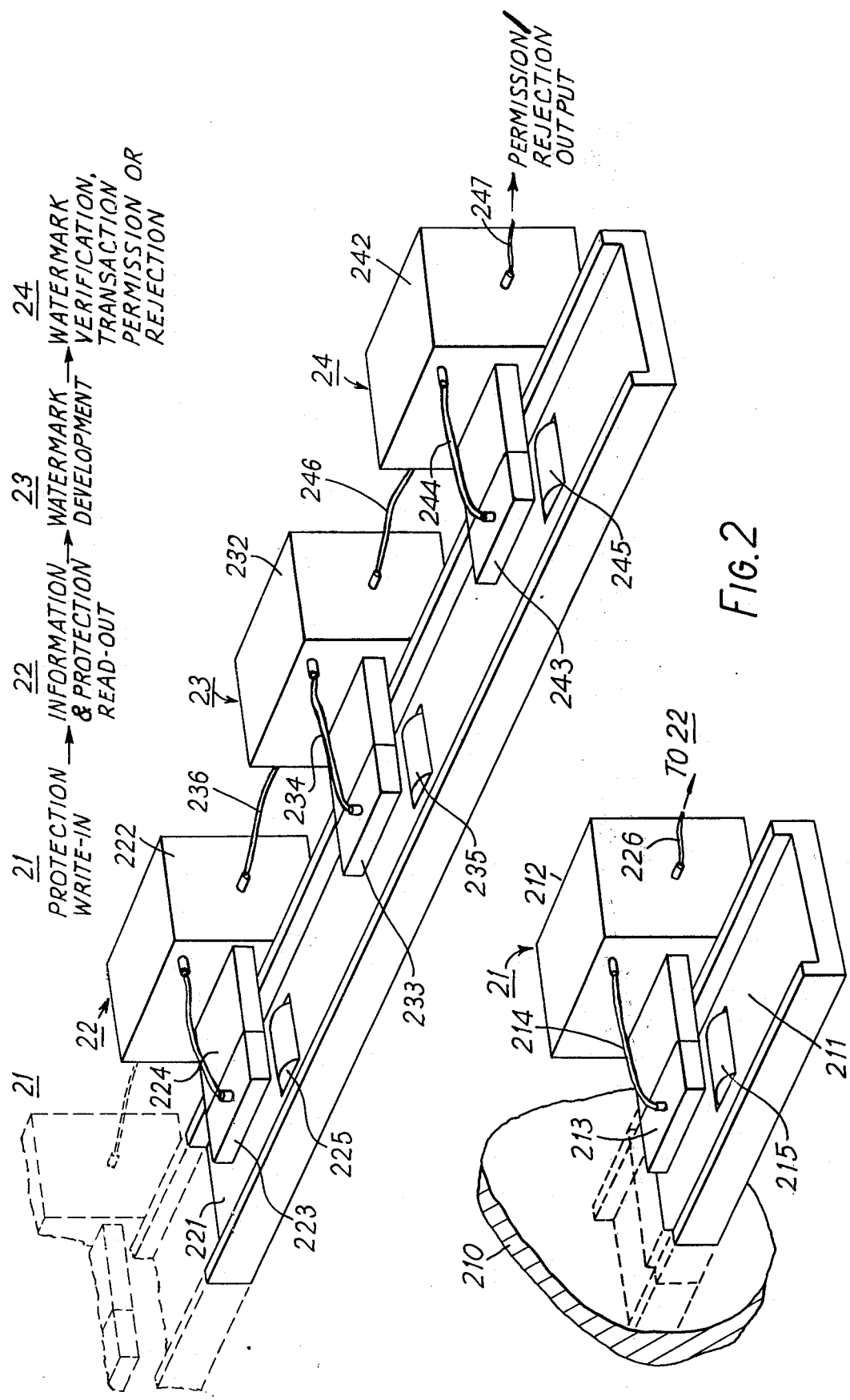

MAGNETIC RECORDING

This invention relates to magnetic recording including permanent records, to media for such recording and methods of using and examining them and to security documents including such media.

The formation of a permanent magnetically readable recording by the alignment of the long axis of acicular particles in selected spaced regions of a single layer medium of a particulate magnetisable material has been proposed. Other regions of the layer are left unaligned or are aligned in a direction perpendicular to that of the selected regions. The selected regions can form a pattern by which information can be recorded on the layer. As the pattern is formed during manufacture of the medium it can be considered to be permenent in that alteration would involve damage to the medium.

Such a pattern is known as a magnetic "watermark" by analogy with the watermark formed in paper. The pattern can be detected and examined by magnetising the layer with a unidirectional magnetic field in one of the alignment directions which produces remanent magnetisation of the particles. The remanent magnetisation will differ in dependence on whether the particles are aligned with or across the field and a suitable magnetic sensor such as a read-out head will produce a signal indicative of these different remanence levels.

Permanent magnetic recordings as described above have been proposed for use in security documents to provide a means by which a genuine document can be identified by a machine action rather than a human one. The security document may be a credit card or a valuable paper such as a bond or security certificate or a identity card passport or key. The portion of medium may be bonded to the document or incorporated in it.

It is in general desirable that the remanence difference signal should be distinct to ease the examination of the record.

It is an object of the invention to provide an improved security document having such a medium.

It is also an object of the invention to provide an improved method of examining a permanent structured magnetic recording medium.

The term security document or security device includes a key, token, pass identity or credit card, passport, banknote, cheque, bond, or share certificate which inter alia is, represents or permits the access to or the transfer of possession of property or money or valuables or information or authorises the presence of a bearer of the document.

According to the invention there is provided a magnetic recording medium of a body of magnetically anisotropic material including a pattern of regions having a distinct permanent magnetic property of the predominant alignment of an easy axis of magnetisation of the material and aother overlying region of lower coercivity and having a permanent predominant alignment of an easy axis of magnetisation of the material of the region.

The invention further provides a security document including a medium as described above and a method and apparatus of examining security documents purporting to include a structural magnetic pattern.

Figure 3:
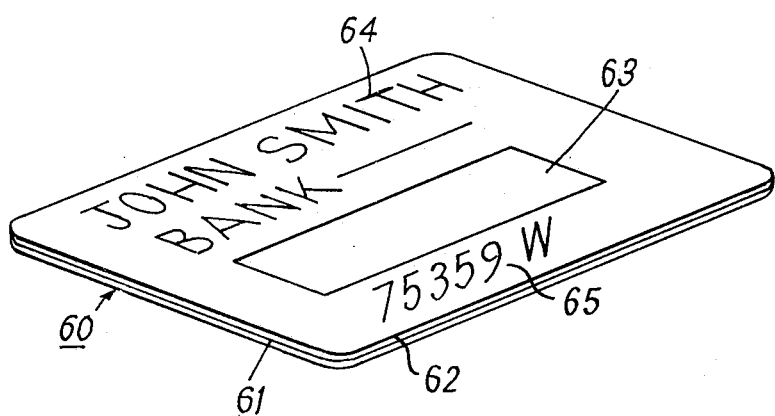

Embodiments of the invention will now be described with reference to the accompanying drawings in which:

FIG. 1 shows a portion of a magnetisable record in tape form and having a permanent magnetic structure, FIG. 2 shows a verification station in block schematic form; and FIG. 3 shows a security document such as a credit card incorporating a portion of a magnetisable record medium.

Referring now to FIG. 1 this shows a record medium in tape form and having a permanent magnetic structure. This medium is arranged to have regions of the body of magnetically anisotropic material formed so that one overlies some others and the overlain regions form a pattern having a permanent distinct magnetic property known as the watermark. Clearly in use either the one "overlying" region or the "overlain" regions may be uppermost subject to restrictions, which will be apparent to those skilled in the art, of recording and readout from the respective regions. Accordingly these terms should be considered as identifying relative position when the body of material is in a chosen position.

Considering FIG. 1 in detail this shows a section of a magnetic tape recording medium. There are two layers of magnetically anisotropic material on a support. Layer 2 is of higher coercivity material than layer 3. Both layers may be deposited, in a suitable binder if required, by any suitable method, as will be apparent to those skilled in the art. The support may be of a flexible plastics material, such as a polyester, or of a more rigid material which may be laminated into a card or incorporated into a paper carrier for a document. Layer 2 is preferably formed of material of a coercivity in one direction in excess of 500 oersteds. Suitable magnetic material particles include chromium dioxide, or iron powder or cobalt loaded iron oxide. The particles of layer 2 are preferably such that a preferred axis of magnetisation can be aligned with the length of the tape. One suitable form for layer 2 is the permanently structured or "watermarked" type of magnetic layer described in United Kingdom Patent Specification No. 1331604; with appropriate coercive force values. The arrows on layer 2 in FIG. 1 represent diagrammatically a watermark of an area 4 in which some particles have been aligned surrounded by unaligned particles.

Layer 3 is preferably formed of material of a coercivity of 200 to 250 oersteds and in any case of such a coercivity that information can be written on it without exceeding the coercive force of layer 2. A suitable material is gamma $Fe_2O_3$ particles in a binder deposited in a uniform layer by any method suitable as will be apparent to those skilled in the art. The particles may be aligned by a magnetic field during deposition, for example along the tape axis as shown, which direction will produce the greatest output with conventional head alignment.

Conventional tape material and binders can be used but care must be taken that the first-deposited layer is not disturbed by the second, e.g. in that the solvent of the second layer releases the particles of the first layer from their alignment. To prevent this an impermeable barrier may be laid down or the first layer may be of the thermosetting resin type as might the barrier.

Layer 3 is shown as the outermost of layers 2 and 3 but it is possible to reverse the positions of layers 2 and 3 if desired, placing the lower coercivity next to the support 1. It would also be possible to have one layer on each side of the support 1. The arrows in layer 3 of FIG. 1 represent diagrammatically the aligned particles of the layer.

By using an information layer of lower coercivity than the permanent pattern layer recording of information the pattern layer can remain demagnetised during each recording as the recording field for the layer 3 will not affect layer 4. Therefore there is little likelihood of interference from the pattern.

Clearly as mentioned above the layer 2 could have other patterns.

FIG. 2 shows, in schematic form, apparatus for the verification of an object purporting to have a magnetic recording medium of the form described above. The object is here assumed to be in the form of a card, such as a "credit card" bearing a portion of a permanently structured magnetic medium, but clearly suitable mechanical arrangements may be made for other forms of the object. In FIG. 2 the vertical scale is distorted for clarity of the drawing. The "card" considered in describing the operation of the apparatus is assumed to have information and verification layers of similar coercivity or to have a verification layer of higher coercivity than the information layer. However the procedure can be adapted to other layer forms, such as those described above, as will be apparent to those skilled in the art.

In one form of verification procedure a presented object is read by a magnetic head and any information detected is recorded in an information store. The object is then subjected to a magnetic field to "develop" the expected "watermark." The object is then read again and any "watermark" information registered. This registered information is compared with stored particulars of the genuine watermark and if the comparison is satisfactory the information recorded earlier is considered valid and the transmission which the presented object authorises is permitted. If required information can be written onto the object to replace any erased during verification. It is important to note that in a genuine object the "watermark" does not modulate the information but an attempt to simulate the "watermark" by thickness changes of a single layer of oxide coating will cause such modulation. Such a procedure can be carried out by units 22, 23, 24 described below.

Referring to FIG. 2 reference 21 indicates a unit to record a protection signal into the information layer 3. The unit has a feedpath including a channel 211 and a drive roller 215 to move the card past a recording head 213. The recording head is supported above the feedpath on container 212 for the recording amplifier and other electrical and electronic circuitry for the unit, lead 214 connecting the head 213 to the amplifier etc. in 212. In operation the card is fed into channel 211 at a point which is separated from head 213 and container 212 by a strong wall 210 to prevent anyone tampering with the unit. The card can be returned by reversing the drive of rollers 215 or by a chute from the far end of channel 211.

The head 213 is supplied with a protection signal which is a signal of known content and level for recording onto layer 3 under set conditions. The recorded signal is read out at a unit 22 similar to unit 21 except that it has further units associated with it. Thus channel 221 can receive a card to be driven by roller 225 past read-out head 223. Head 223 is connected by lead 224 with its associated electrical and electronic apparatus in container 222. Unit 22 also reads out any other information recorded on the card. The read-out protection signal is compared, in content and level with a reference in unit 22. If layer 3 is uniform then the read-out signal will agree with the reference, within some selected degree of tolerance. However if an attempt has been made to simulate a watermark in a fraudulent card by thickening parts of layer 3, or some other layer, then the thickened regions will distort the protection signal from the reference and the fraudulent card will be detected and dealt with as appropriate. Thus if a genuine card is returned to a presenter by eventually reversing the drive of rollers 225, 235, 245 the forward drive can be continued for a fraudulent card, taking it away from the presenter. Units 21 and 22 can be separate, unit 21 being at a location where cards are made or issued and unit 22 being at a transaction point or the units can be associated and linked by signal connection 226 so that the protection signal is written and read without the card being returned to a presenter, thus avoiding tampering. The two units could of course be combined in this case as indicated by the dotted outline of unit 21 in FIG. 2.

Unit 23 has another function. In the developing and verification of any watermark of layer 2 information in layer 3 may be destroyed or varied. Accordingly all information written into the card is readout and recorded in a store by unit 22. This occurs whether or not the protection signal cycle is used.

From unit 22 the card passes along the feedpath to unit 23 where the watermark is developed e.g. by exposure to a saturating magnetic field from head 233. Alternatively the card is exposed first to a demagnetising field and then a field of specific intensity to produce the water-mark remanence pattern. Again the head 233 is supported on a container 232, for the electrical and electronic equipment, over a drive roller 235 in the feed path of channel 221. Head 233 is connected to container 232 by lead 234 and container 232 is connected to unit 22 by a signal lead 236. After development the card is transferred to unit 24 for verification in a known manner. This involves the reading out of any remanence patterns which derived from layer 2 of FIG. 1.

Assuming that the vertification step is satisfactory the information recorded in unit 22 is considered genuine and whatever transaction requested by the presenter is permitted as authorised by the card. Such a transaction may be the issuing of cash, the opening of a door of a building room or safe, or the dispensing of goods, such as petrol from a self-service pump. The various units are controlled from one unit over the interconnections to process the card through the units.

Unit 24 can be arranged to re-record information either exactly as erased during verification or as updated, say to indicate the effect of the transaction authorised.

Clearly units 22, 23 and 24 can operate with or without the protection cycle of units 21 and 22 although this cycle makes it much more difficult to defraud the equipment with a spuriously watermarked card, e.g., a thickness variation of one magnetic layer. However even this variation would be very difficult to achieve, particularly as the correct remanence levels and coercive force must also be produced. The use of two layers provides a magnetic medium in which information and verification can be independent e.g. by different coercivity values in each layer. When the layer 2 (FIG. 1) has a higher coercivity than layer 3 the latent permanent magnetic signal, in layer 2, does not prevent the independent recording and reproduction of information on layer 3 and is not detected in this use of layer 3. However when the latent signal is required it can be developed and detected by a flux sensitive head or a conventional rate of change of flux head.

As the verification process destroys information in layer 3 this must be replaced from the store in unit 22 before the card is returned to the presenter. Clearly the information can be updated is required on being rewritten onto the card.

The sequence of units described above can be achieved in other ways. For example unit 21 could also function as unit 23 and unit 22 as unit 24 so by reciprocating the card in the feed path economy of units could be achieved at the expense of greater control complexity. Other such arrangements are clearly possible.

Although a card and tape has been specifically described the invention is clearly applicable to other forms of magnetic recording media and to other carriers for security documents, materials or devices.

Thus, by way of example, FIG. 3 shows a security document in the form of a credit card 60. Such a card is formed of two layers of plastics material, 61 and 62 respectively, laminated together. A body of magnetic recording medium 63 is secured to the card by, e.g. hot blocking a piece of medium from a tape substrate onto the card laminate. Printed or other readable information may be applied to the card as at 64 and/or 65.

The body of medium 63 has a permanent magnetic structure from which the authenticity of the card can be verified and the body 63 can also form a record medium for information which is magnetically recorded on the medium for use at a transaction station. The information may be revised when required as described aove. By arranging the medium as described above the information and verification can be recorded in the same body of medium in superimposed relationship. This can lead to a reduction of the area of magnetic material on the card which if expensive materials are requred can be a significant point. Also the superimposition of the information and vertification provides some extra protection in that tampering with one is likely to affect the other and be detected at a transaction station.

What I claim is:

1. A secure magnetic record medium of a body of magnetically anisotropic material having overlaid distinct portions of material, a first portion having a uniform predominant alignment of an easy axis of magnetisation of the material to provide for erasable magnetic recording and a second portion of material of higher coercivity and having a detectable pattern of the variation from point to point of the portion of the permanent predominant alignment of an easy axis of magnetisation of the material to provide by said pattern secure unerasable record, the pattern being latent until made detectable by remanent magnetisation removable to leave the latent pattern, whereby an erasable recording can be made and read without interaction in the read-out signal from the latent secure record pattern.

2. A medium according to claim 1 in which the medium includes an elongate layer and the predominant alignment of the overlying region is along the length of the layer.

3. A medium according to claim 1 including a non-magnetic region between the regions forming the pattern and the overlying regions.

4. A medium according to claim 1 in which the regions forming the pattern are of higher coercivity than the overlying region to permit the recording of information on the overlying region without magnetising the pattern of regions.

5. A medium according to claim 4 in which the overlying areas has a coercivity of some 200 – 250 oersteds and is formed of acicular gamma $Fe_2O_3$ particles and the regions forming the pattern have of a coercivity of at least 500 oersteds and are formed of acicular magnetic particles of $CrO_2$ or iron powder or cobalt loaded iron oxide.

6. A security document including a medium for erasable magnetic recording of a body of magnetically anisotropic material including a pattern of a permanent magnetic property as claimed in claim 1.

7. A security document as claimed in claim 6 and including a revisable information store in said another region readable without interference from said pattern.

8. A method of examining an object purporting to be a security document and have a magnetic record medium with a permanent structure of a pattern of groups of distinctly aligned regions of anisotropic material and a layer of lower coercivity for erasable recording of information, including reading and storing information erasably recorded on said medium, applying a magnetic field to said medium to record a protection signal of known form, that is lever and content, into an authentic erasable recording layer, reading any recorded protection signal and comparing the read-out protection signal with the known form to detect anomolies of form as can be caused by simulation of a permanent alignment remanence pattern by variation in the thickness of the material.

9. A method according to claim 8 further including applying a magnetic field of a strength only to record on an authentic erasable recording layer, without recording on an authentic pattern layer to produce the remanence pattern, a protection signal of known form, reading any recorded protection signal and comparing the read-out protection signal with the known form to detect anomalies of form as can be caused by simulation of a permanent alignment remanence pattern by variation in the thickness of the material.

10. Apparatus for examining an object purporting to be a security document and have a magnetic record medium with a permanent structure of a pattern of distinctly aligned regions of anisotropic material, including a first station for the recording of a protection signal of known form on the medium a second station for the read-out of information and said protection signal from the medium, a third station for the unidirectional magnetisation of the medium to above its coercive force value to develop said pattern as a remanence variation signal, a fourth station to read-out said pattern of remanence variation, means responsive to the read-out protection and remanence variation signals and to reference forms thereof to assess the veracity of the document and permit or prohibit any transaction requested on the basis of the document.

11. Apparatus as claimed in claim 10 assembled in a housing including means to transport said document to the stations in turn.

* * * * *